United States Patent
Citro et al.

(10) Patent No.: US 10,458,504 B2
(45) Date of Patent: Oct. 29, 2019

(54) SHOCK-ABSORBING DEVICE

(71) Applicants: SAES GETTERS S.P.A., Lainate (IT); GRUPPO ROLD S.P.A., Nerviano (IT)

(72) Inventors: Marco Citro, Varese (IT); Gaetano Cascini, Florence (IT); Francesco Butera, Como (IT); Paolo Barbatelli, Spoleto (IT)

(73) Assignees: SAES GETTERS S.P.A., Lainate (MI) (IT); GRUPPO ROLD S.P.A., Nerviano (IT)

( * ) Notice: Subject to any disclaimer, the term of this patent is extended or adjusted under 35 U.S.C. 154(b) by 0 days.

(21) Appl. No.: 14/888,420

(22) PCT Filed: Jul. 22, 2014

(86) PCT No.: PCT/IB2014/063304
§ 371 (c)(1),
(2) Date: Oct. 30, 2015

(87) PCT Pub. No.: WO2015/011642
PCT Pub. Date: Jan. 29, 2015

(65) Prior Publication Data
US 2016/0069410 A1    Mar. 10, 2016

(30) Foreign Application Priority Data
Jul. 25, 2013  (IT) .......................... MI2013A001249

(51) Int. Cl.
*F16F 1/36* (2006.01)
*F16F 7/14* (2006.01)
*F16F 3/02* (2006.01)

(52) U.S. Cl.
CPC ................. *F16F 7/14* (2013.01); *F16F 3/02* (2013.01); *F16F 2224/0258* (2013.01)

(58) Field of Classification Search
CPC ............ F16F 7/14; F16F 3/02; B29C 44/1233
USPC .................. 188/371–379; 267/148, 146, 149
See application file for complete search history.

(56) References Cited

U.S. PATENT DOCUMENTS 2,762,739 A * 9/1956 Weiss .................. B29C 44/1233
156/292
3,018,210 A    1/1962 Frieder et al.
3,138,506 A * 6/1964 Ross ...................... B29C 70/44
156/147

(Continued)

FOREIGN PATENT DOCUMENTS

DE    102012204059 B3    6/2013
EP         0226826 A2    7/1987

(Continued)

OTHER PUBLICATIONS

1-International Search Report issued for International Application No. PCT/IB2014/063304 filed on Jul. 22, 2014 in the name of Saes Getters S.P.A. dated Jan. 15, 2015.

(Continued)

*Primary Examiner* — Christopher P Schwartz
(74) *Attorney, Agent, or Firm* — Birch, Stewart, Kolasch & Birch, LLP.

(57) ABSTRACT

A shock-absorbing devices comprising a plurality of slender metallic structures having a slenderness ratio equal to or higher than 10 is described. Systems and/or components using such devices are also described.

20 Claims, 7 Drawing Sheets

(56) References Cited

U.S. PATENT DOCUMENTS

Figure 1A:
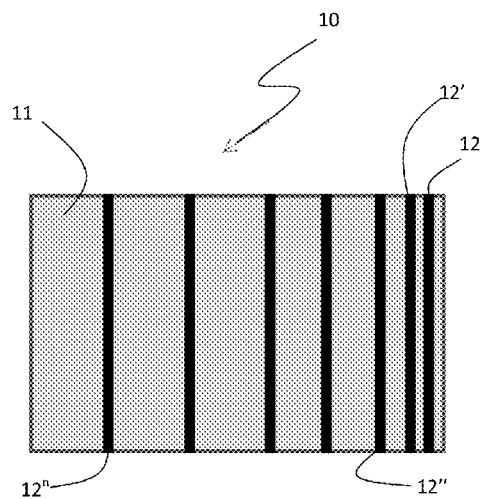

| | | | |
|---|---|---|---|
| 3,360,225 A | | 12/1967 | Camossi |
| 3,616,126 A | * | 10/1971 | Tungseth ............... F16F 1/44 |
| | | | 156/166 |
| 4,067,752 A | | 1/1978 | Brook et al. |
| 4,144,057 A | | 3/1979 | Melton et al. |
| 6,290,037 B1 | * | 9/2001 | Williams ............ F16F 7/1005 |
| | | | 188/379 |
| 6,460,837 B1 | * | 10/2002 | Ahern .................... F16F 7/08 |
| | | | 267/148 |
| 6,530,564 B1 | * | 3/2003 | Julien ................ A43B 13/186 |
| | | | 267/147 |
| 6,886,622 B2 | * | 5/2005 | Villhard .................. F01D 5/16 |
| | | | 164/100 |
| 8,282,746 B2 | * | 10/2012 | Schuh ..................... C22C 9/00 |
| | | | 148/402 |
| 9,194,452 B2 | * | 11/2015 | Hawkins ............. F16F 1/3615 |
| 2004/0051219 A1 | * | 3/2004 | Sherwin ................. F01D 5/26 |
| | | | 267/136 |
| 2004/0195815 A1 | * | 10/2004 | Browne ............... B60R 21/04 |
| | | | 280/753 |
| 2005/0236209 A1 | * | 10/2005 | Chernoff ............. B60R 21/18 |
| | | | 180/268 |
| 2009/0126288 A1 | * | 5/2009 | Fanucci ................ F16F 15/04 |
| | | | 52/167.1 |
| 2011/0031665 A1 | | 2/2011 | Defranks |
| 2014/0304877 A1 | | 10/2014 | Fonte et al. |

FOREIGN PATENT DOCUMENTS

| | | |
|---|---|---|
| EP | 2639476 A1 | 9/2013 |
| WO | 98/57014 A1 | 12/1998 |
| WO | 2010/053602 | 5/2010 |
| WO | 2011/053737 A2 | 5/2011 |
| WO | 2013/042152 A1 | 3/2013 |
| WO | 2015/011642 A1 | 1/2015 |
| WO | 2016/203344 A1 | 12/2016 |

OTHER PUBLICATIONS

2-Written Opinion issued for International Application No. PCT/IB2014/063304 filed on Jul. 22, 2014 in the name of Saes Getters S.P.A. dated Jan. 15, 2015.

3-International Preliminary Report on Patentability issued for International Application No. PCT/IB2014/063304 filed on Jul. 22, 2014 in the name of Saes Getters S.P.A. dated Jul. 8, 2015.

Donohue, Barbara. "Developing a Good Memory: Nitinol Shape Memory Alloy", *Today's Machining World*, Mar. 2009, pp. 42-48.

* cited by examiner

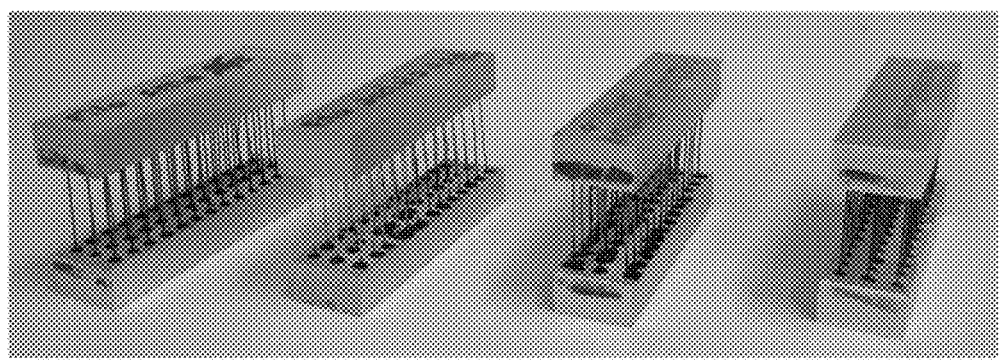
Fig. 8
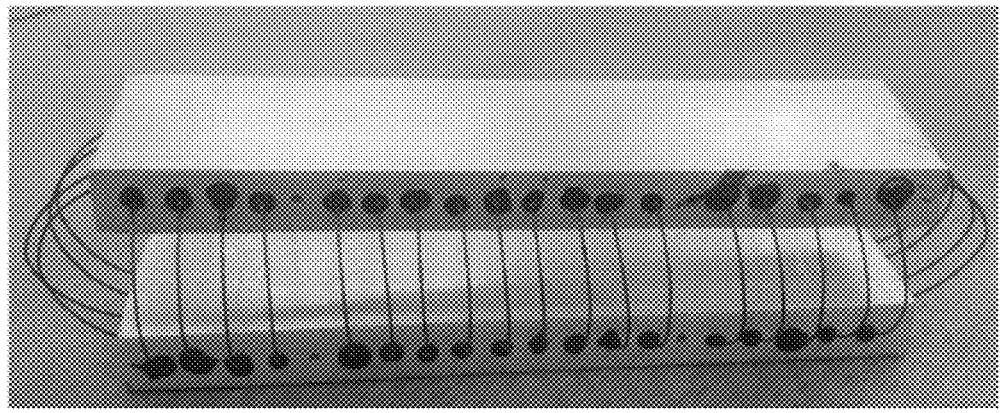
Fig. 9: Comparative Example

SHOCK-ABSORBING DEVICE

CROSS REFERENCE TO RELATED APPLICATIONS

The present application is the U.S. national stage entry of International Patent Application No. PCT/IB2014/063304, filed internationally on Jul. 22, 2014, which, in turn, claims priority to Italian Patent Application No. MI2013A001249, filed on Jul. 25, 2013.

The present invention relates to improved shock-absorbing devices and systems and/or components using such shock-absorbing devices. The term "device" shall be construed in its widest meaning and encompasses finite and stand-alone devices/shock-absorbing systems as well as parts or sub-assemblies incorporated in bigger or more complex systems.

Improved shock-absorbing devices are required in a variety of applications, the improvements concerning the ability to withstand a plurality of hits from external sources, i.e. durability, as well as a more efficient energy dissipation mechanism, i.e. enhanced protection.

The fields of application of shock absorbers are very different and range from mechanical subassemblies, such as bumpers for the automotive industries (cars, trucks) and train platforms bumpers, to components intended to be incorporated into textile fabrics for safety garments or cloths such as motorbike jackets. Even though according to the specific application or field of use either durability or enhanced protection may provide a predominant advantage, the improved shock-absorbing device according to the present invention features both high durability and enhanced protection.

In the field of closure systems both these features are concurrently relevant, e.g. for the application in stop buffers for doors, windows and gates.

Another remarkable aspect of the present invention is that its structural features may be easily adapted to systems and components having a very different size, whereby the shock-absorbing device may be easily integrated into the final systems/components for the different applications.

In a first aspect thereof the invention relates to a shock-absorbing device comprising a first holding element, a plurality of slender metallic structures having a slenderness ratio equal to or higher than 10, wherein the slender metallic structures are respectively fixed at a first end thereof to said first holding element, characterized in that:
- the slender metallic structures are respectively fixed at a different points of said first holding element;
- the mutual distance between the slender metallic structures of at least one pair of slender metallic structures is equal to or lower than 0.75 times their length L, i.e. 0.75*L, said distance being measured with respect to their first ends;
- at least 90% of the planes 1202 perpendicular to adjacent slender elements are mutually parallel or form an angle lower than 20°.

Figure 1B:
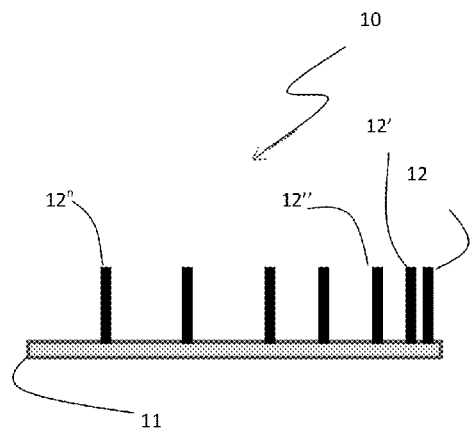
Figure 2A:
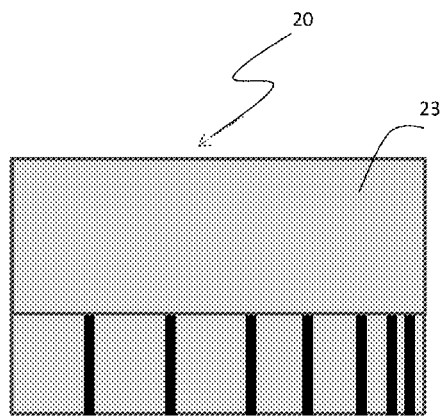
Figure 2B:
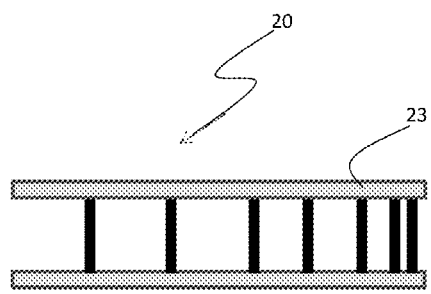
Figure 3A:
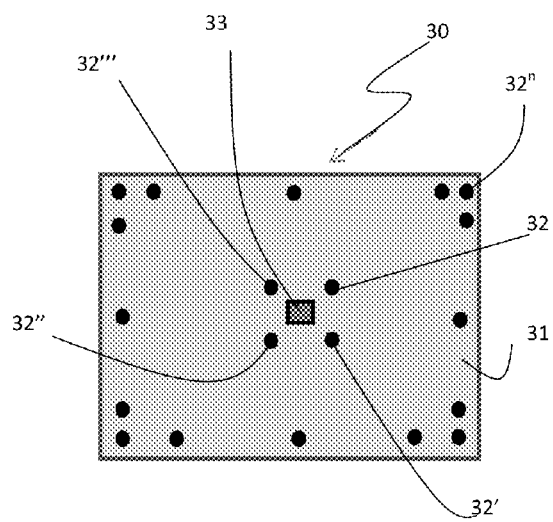
Figure 3B:
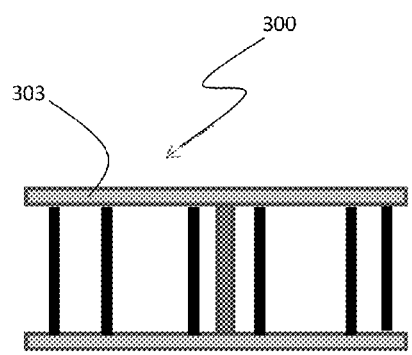
Figure 3C:
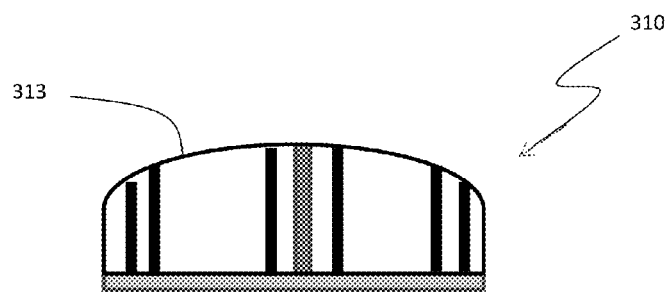
Figure 4:
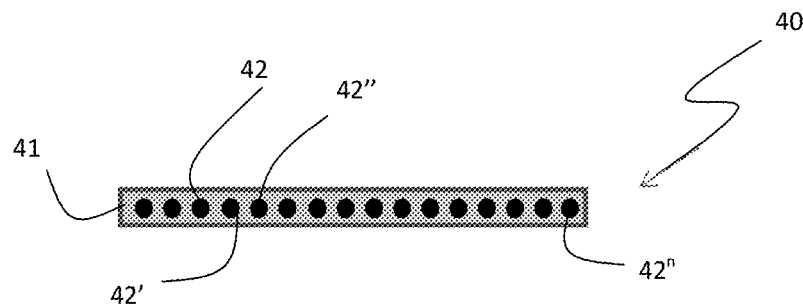
Figure 4A:
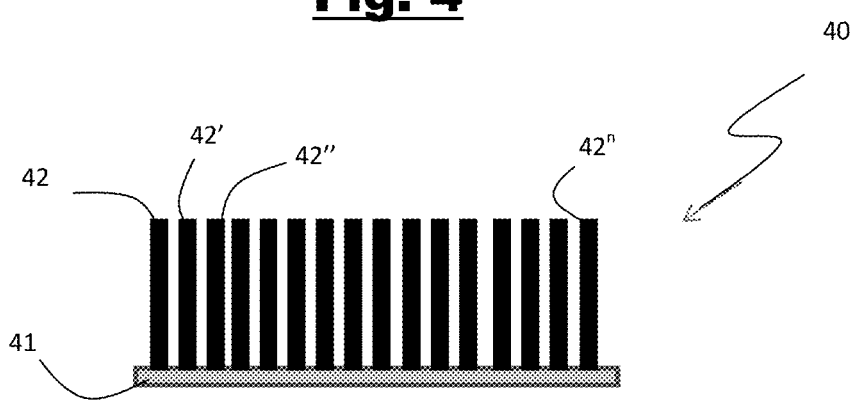
Figure 5:
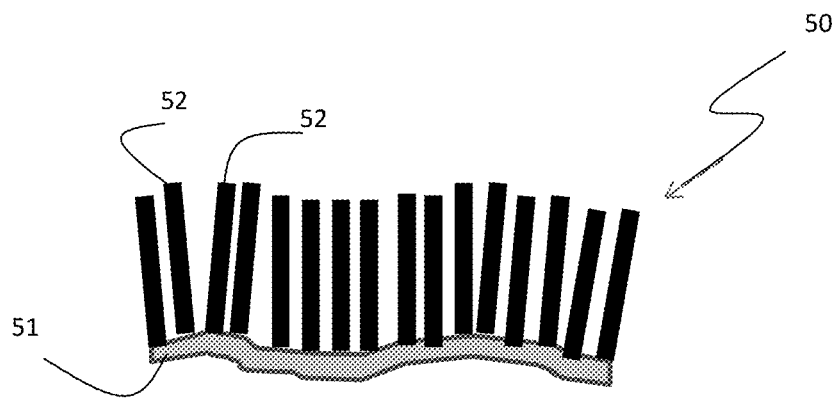
Figure 6:
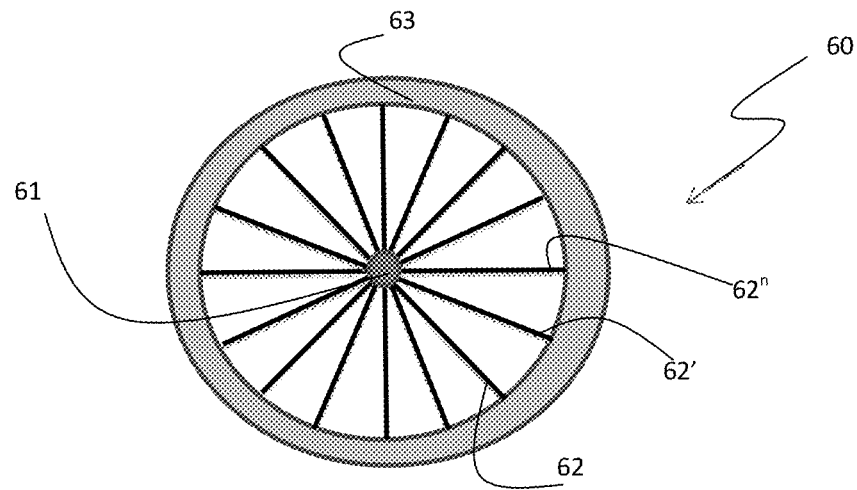
Figure 7:
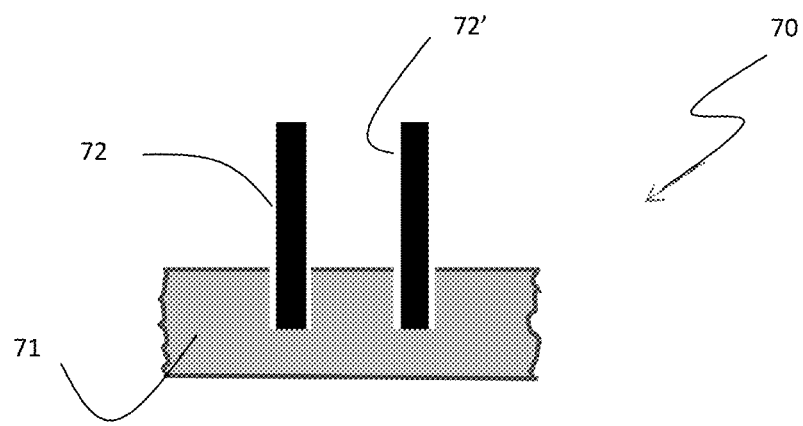
Figure 10:
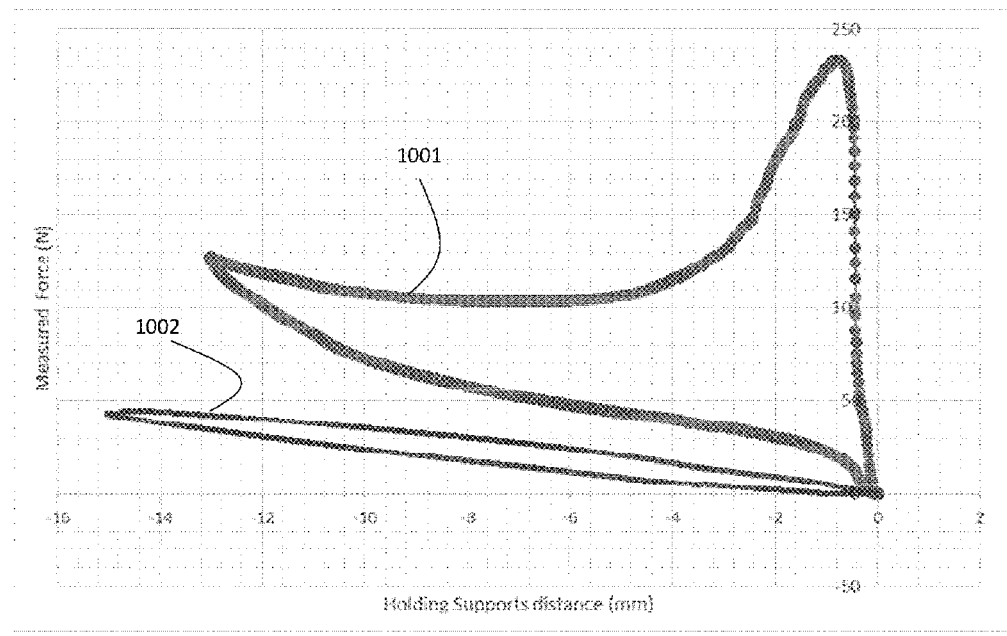
Figure 11:
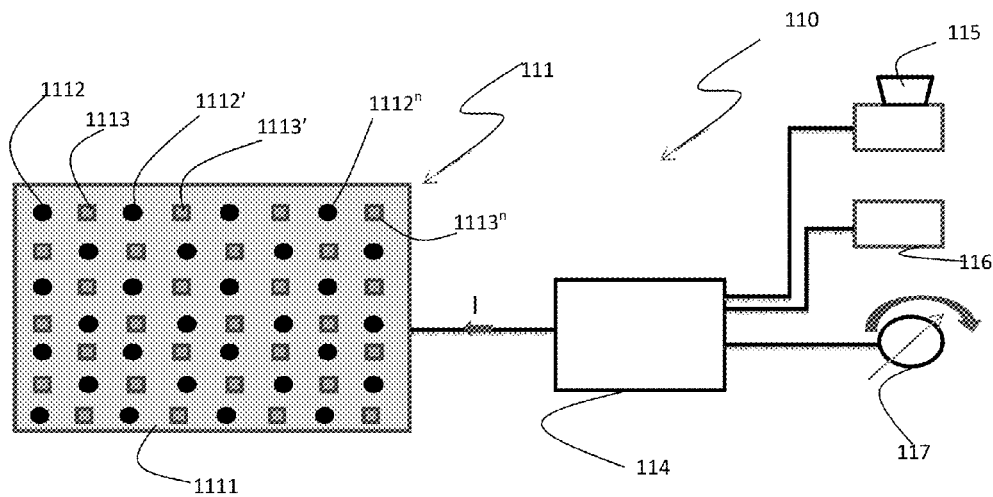

The invention will be further illustrated with reference to the following figures wherein:

FIGS. 1A and 1B respectively schematically show a top view and a front view of a shock-absorbing device according to the present invention comprising laminar or sheet slender elements, FIGS. 2A and 2B respectively schematically show a top view and a front view of an alternative embodiment of a shock-absorbing device according to the present invention comprising laminar slender elements, FIGS. 3A-3C respectively schematically show a top view and alternative front views of a shock-absorbing device according to the present invention comprising filiform slender elements, FIGS. 4-4A and 5 show an alternative embodiment of a shock-absorbing device according to the present invention comprising filiform slender elements, FIG. 6 is a cross-sectional view schematically showing an alternative embodiment of a shock-absorbing device according to the present invention having a spherical geometry, FIG. 7 is partially broken view schematically showing a portion of a shock-absorbing device according to the present invention, FIG. 8 is a picture of a shock-absorbing devices according to the present invention, FIG. 9 is a picture of a shock-absorbing made according to the prior art, FIG. 10 is chart showing a comparison between the performances of one of the devices shown in FIG. 9 and the device of FIG. 10, FIG. 11 is an exemplary operational scheme of a system comprising a shock-absorbing device according to the present invention.

Figure 12:
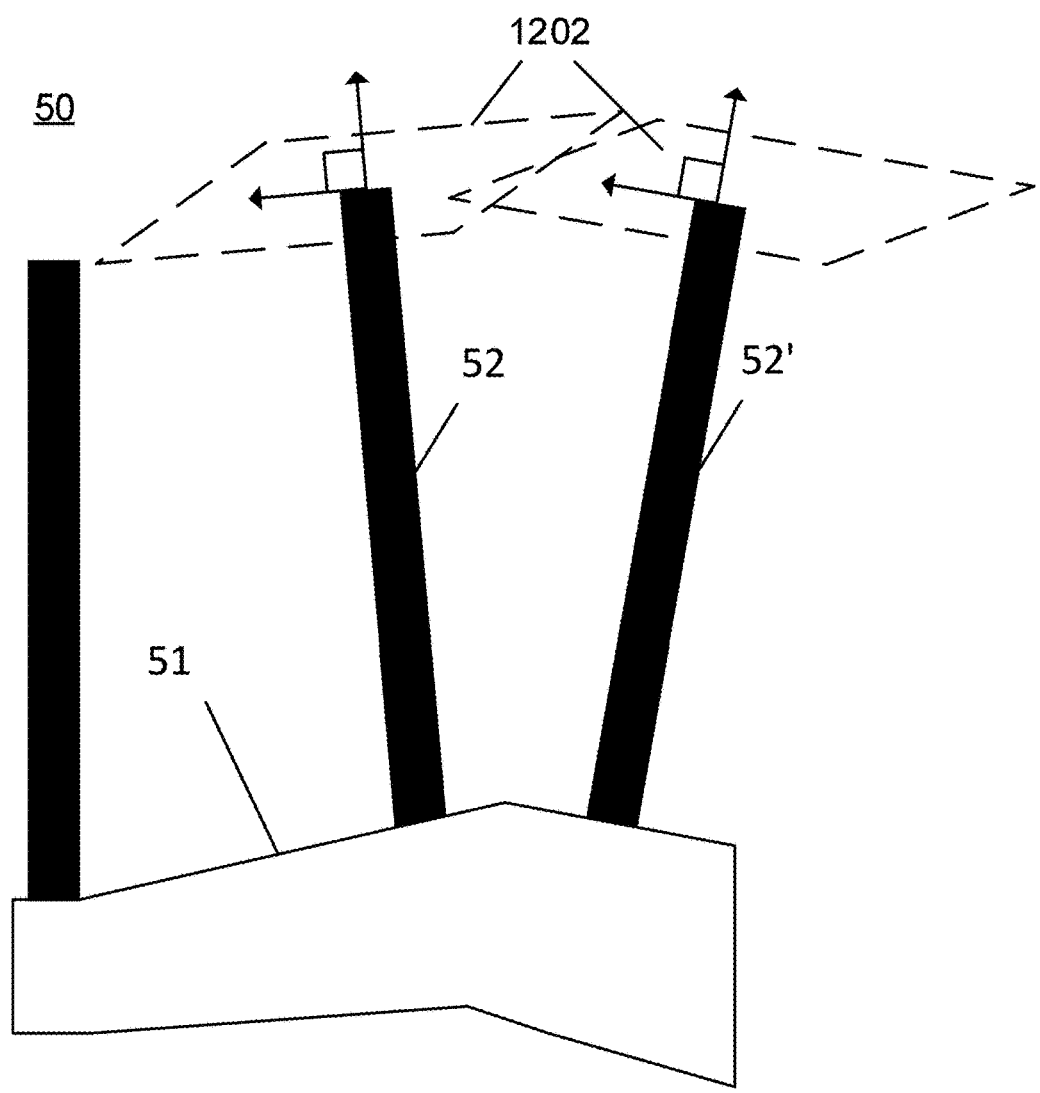

FIG. 12 shows an alternative embodiment of a shock-absorbing device according to the present invention illustrating the planes perpendicular to the filiform slender elements.

In order to make the figures easier to understand, dimensions and dimensional ratios of the elements have in some cases been altered, with particular and nonexclusive reference to the height and width of the slender metallic structures.

The slender metallic structures apt to be used in the shock-absorbing device according to the present invention have a slenderness ratio, i.e. the ratio between their length L and the smaller transverse dimension w, equal to or higher than 10. As shown in the drawings, the slender metallic structures of the invention are flat laminar or sheets elements and/or straight filiform or wire elements. The embodiments of the invention shown in FIGS. 1-8 comprise either flat laminar or sheet elements, or straight filiform or wire elements, as it will be discussed in detail in the following. The shock absorbing devices of the invention may also comprise combinations of flat laminar or sheet elements and straight filiform or wire elements.

For the sake of clarity the slender structures according to the present invention are straight/rectilinear (filiform) or planar/rectilinear (laminar), i.e. for at least 90% of their length tangent lines they form an angle lower than 5° with the axis (straight) or central plane (laminar) of the slender structure. The 90% length condition takes into account that the slender structures are real and not ideal members, and also that the ends of the slender structures may be distorted/deformed as consequence of their placement in the shock absorbing device of the present invention. Similarly, the condition that the angle between tangent lines and slender structures is lower than 5° takes into account departing form the ideal condition in which these members are perfectly straight or planar.

Also, even though the preferential solution envisions elements all made by straight slender structures, it is possible for few of them (less than 10%) to have non-linear shape as per the definition above. Said fraction is preferably less than 5% and even more preferably less than 1%.

These considerations are due to and take into account that shock absorbing system according to the present invention may comprise, in some specific embodiments, a high number of straight or laminar slender structures, so it is possible that some of them depart from the ideal linearity condition as consequence of mounting within the system, but without compromising or significantly affecting the overall performance of the system.

As per above clarification, the slender elements in the shock absorbing system of the present invention are distinct elements that cooperatively achieve the technical effect of improved shock absorbing features, differently from the case of multi-strand cables that will be thereafter discussed with reference to the state of the art.

The overall configuration of the shock-absorbing devices according to the present invention is such that the straight and/or flat slender structures withstand compressive loads directed along their axes in the case of filiform or wire elements or parallel to their planes in the case of laminar or sheet elements.

Hence, the shock absorbing devices of the invention effectively exploit the so called "buckling effect" of straight or flat slender structures, i.e. their capability under compressive loads and impacts to have a transition from simple compression to bending, with consequent large deformation.

In mechanical science, buckling is a phenomenon due to instability, leading to a failure mode. Buckling defines a point where an equilibrium configuration becomes unstable under a parametric change of load and can manifest itself in several phenomena. Theoretically, buckling is caused by a bifurcation in the solution to the equations of static equilibrium. At a certain stage under an increasing load, further load is able to be sustained in one of two states of equilibrium. In the specific case of a straight structure subjected to compressive load, the equilibrium could theoretically be found in either a simple compression or a laterally-deformed state. Actually, the second state is largely the most probable one and it implies large deformations.

If the slender structures are made of a material capable to withstand large deformations, the absorbed energy radically increases. The present invention relies on an original layout of slender structures suitable to exploit this physical effect to a maximum extent, so as to be used for shock-absorbing assemblies and devices.

In view of the above explanation and of the depicted embodiments, it is also important to remark that the slender structures used in the shock absorbing devices of the present invention are single straight filiform elements and/or flat laminar element that may be adjacent to each other but are not intertwined, nor joined or twisted together.

Hence, slender structures such as e.g. ropes or multi-strand cables are explicitly outside the scope of the present invention, because they cannot support any compressive load, nor may they undergo buckling. These types of structures are described in the international patent publication WO 2013/042152 and the U.S. Pat. No. 3,360,225 and rely on the specificity and strength of cable structures made up of a plurality of strand/wires used as active element for absorbing or damping shocks. It is to be underlined that in this case damping is achieved thanks to the friction among adjacent wires and not through deformations resulting from displacements as it happens according to the present invention.

As already outlined, the present invention is based on the use of straight and/or flat slender structures undergoing buckling during use. Prior art shock absorbing devices instead rely on non- straight or flat structures such as those described in the European patent application 2639476, U.S. patent application 2009/0126288 and U.S. patent application 2011/0031665, which clearly cannot undergo buckling deformations.

To further appreciate the difference between prior art shock absorbing devices and those according to the present invention, a comparative example is set forth in the following, wherein a prior art shock absorbing device (see FIG. 9) resembling the shock absorbing device disclosed by the European patent application 2639476 has been used.

In the present invention, the straight and/or flat slender structures are arranged so as to absorb the energy of impacts acting in a direction perpendicular to planes that are in turn perpendicular to the slender structures, e.g. in the case of straight filiform slender structures impact forces that are essentially directed along their axes.

Slender structures in the form of flat laminar or sheet elements are preferred when a preferential collapsible direction is needed, for example in the case of head supports in vehicle seats, configured to prevent lateral movements and displacement following an incident.

Slender structures in the form of straight filiform elements having a ratio equal to or higher than 10 between L and any transverse dimension are preferred in the case of soft holding elements, for example fabrics incorporating metallic wires.

Filiform elements may be tubular (i.e. their core is empty) or in the form of wires.

Shock-absorbing devices using slender metallic structures are e.g. disclosed in U.S. Pat. No. 6,530,564, wherein slender metallic filiform elements in the form of wires have common contact points with the holding element. This configuration results in less performing shock-absorbing systems compared to the ones made according to the present invention, since they just rely on bending deformation rather on buckling.

A different type of absorbing structure for vibration damping is described in the international patent application WO 2010/053602, wherein spaced pillars of superelastic materials are disclosed as vibration absorbing devices for MEMS.

A schematic representation of a top view of a shock-absorbing device 10 according to the present invention is shown in FIG. 1A, while a front view thereof is shown in FIG. 1B.

In this embodiment the slender structures 12, 12', 12", . . . , 12"' are laminar elements all parallel to each other and respectively fixed at a first end thereof onto a first holding element 11 that forms a base of the shock-absorbing device 10. According to the invention, the mutual distance of slender elements of at least one pair of slender elements, e.g. elements 12, 12', is equal to or lower than 0.75*L, wherein L indicates the length of the metallic slender elements measured with respect to their first ends.

The shock-absorbing device 10 may also comprise a second holding element connected to the slender metallic structures at second ends thereof opposite to their first ends. FIGS. 2A and 2B respectively show a top view and a front view of a shock-absorbing device 20 according to the invention, that similarly to the shock-absorbing device 10 of FIGS. 1A and 1B comprises a base holding member and a plurality of parallel slender metallic structures fixed thereto. The shock-absorbing device 20 also comprises a second holding member 23 connected at the second ends of the slender metallic structures. As shown in FIG. 2A the second holding member 23 may be fixed to the slender metallic structures only partially, although the two holding elements are preferably sized so as to overlap each other.

An alternative interesting configuration for both these embodiments envisions the use of almost equally spaced and parallel slender structures, provided that their mutual distance is equal to or lower than 0.75*L.

It is important to remark that the structures schematically shown in the figures are ideal structures. In a real shock-absorbing device in fact the slender metallic structures may be not perfectly parallel to each other. According to the invention, the planes perpendicular to the slender metallic structures may also form an angle equal to or less than 20° without affecting the performance of the shock-absorbing device. Moreover, the above condition shall be true for at least 90% of the slender metallic structures, being it acceptable that a minor amount of them does not conform to the above condition.

A different embodiment 30 of a shock-absorbing device according to the present invention, using filiform slender metallic structures is schematically shown in the top view of FIG. 3A. According to this embodiment of the invention, the shock-absorbing device comprises two different types of filiform slender metallic structures. The differences between the slender metallic structures may concern their shape, e.g. cross section, diameter and the like, metallic material, or both. In this case onto first holding element 31 a plurality of slender metallic structures 32, 32',32'',32''', . . . 32" having e.g. a circular cross section are fixed, while a metallic slender structure of a different type 33, e.g. having a square cross section, is arranged at a central part of the shock-absorbing device 30. The condition according to which at least two slender structures are arranged at a mutual distance equal to or lower than 0,75*L may be ensured by any one of the pairs formed by the slender metallic structure 33 and any one of its adjacent metallic slender structures 32, 32', 32", 32''', . . . 32".

A first variant of the shock-absorbing device 30 is a shock-absorbing device 300 whose front view is shown in FIG. 3B. The shock-absorbing device 300 comprises a second holding element 303 acting as upper holding element.

Another variant of the shock-absorbing device 30 is a shock-absorbing device 310 whose front view is shown in FIG. 3C. In this case, the metallic slender structures have different heights, the ones arranged in the central portion of the device being higher than those progressively arranged towards its periphery. The shock-absorbing device 310 further comprises a second holding element 313 fixed at the free ends of the slender metallic structures and having a dome shape.

Also in this case the majority, in particular 90% or higher, of the metallic filiform elements are substantially parallel to each other, i.e. being them filiform elements in a tri-dimensional space, which means that their normal planes are parallel or form an angle equal to or lower than 20°.

It is important to remark that the dimensions and dimensional ratios of the elements and structures shown in FIGS. 3B and 3C have been altered for clarity purposes, and that the filiform slender metallic structures have a maximum width that is 1/10 or less that the filiform metallic structure height.

The shock-absorbing devices according to the present invention do not require a specific holding element in terms of shape or structure. FIG. 4 e.g. schematically shows a top view of a portion of a shock-absorbing device 40 comprising a base holding element in the form of an elongated strip 41 over which slender metallic structures 42, 42', 42", . . . 42" are fixed and aligned in one row. In the particular embodiment represented in FIG. 4, all the slender metallic structures are equal to each other and equally spaced, but as already described this is not a requirement for the invention.

FIG. 4A shows a schematic front view of a portion of shock-absorbing device 40. System 40 has been represented with only a base or lower holding element 41, but it may also comprise an upper holding element.

In other words, the main function of the holding element is just to fix and hold the slender metallic structures and to ensure that the geometric conditions on the planes perpendicular to the slender metallic structure is satisfied.

As shown in the front view of FIG. 5 and FIG. 12, the holding member 51 of a shock absorbing device 50 according to the invention may even be not planar. Moreover, as already pointed out, it is acceptable that a percentage lower than 10% of the adjacent slender metallic structures does not respect the geometrical condition that their normal planes 1202 are mutually parallel or form an angle equal to or lower than 20°, such as e.g. in the case of the adjacent slender metallic structures 52, 52' shown in FIG. 5 and FIG. 12, due to the non-planar shape of the holding member 51.

FIG. 6 schematically shows a cross section of another embodiment of a shock-absorbing device 60 according to the present invention. In this case, the shock-absorbing device has a spherical geometry, wherein the slender metallic structures 62, 62', . . ., 62", are fixed onto a central holding element 61. The shock-absorbing device 60 shown in FIG. 6 may also comprise an outer holding element 63 connected at the opposite ends of the slender metallic structures 62, 62', . . . , 62". Due to the spherical geometry of the shock-absorbing device 60, the slender metallic elements cannot be parallel and in this case at least 90% of them satisfy the condition that the planes 1202 perpendicular to adjacent slender metallic structures form angles equal to or lower than 20°.

A possible way to fix the metallic slender structure onto the holding element is shown in FIG. 7, representing a partially broken view of a shock-absorbing device 70 according to the present invention. As shown in the figure slender metallic structures 72, 72' are inserted in a holding element 71 for a certain part of their length.

In this case two main possibilities are envisioned to fix the slender metallic structures. In one case the holding element 71 comprises cavities that are larger than the slender metallic structures inserted therein. A gluing filler fills the cavities thus achieving a retaining function. This solution is preferred in case of rigid or hard holding elements acting as base/substrates. In the case of softer materials, such as for example fabrics, the slenderness of the structures allows to press fit them onto the holding element.

In both cases, the terminal part of the slender structure enters into the holding structure preferably for at least 10% of the slender metallic structure L.

Another possibility to fix the slender metallic structures onto the holding element is by means of slender structures embedded in a suitable filler that adheres to the holding element and keeps the slender metallic structures in position. In this case, provision of a pair of holding elements fixed at the opposite ends of the slender metallic structures is preferred, because they both contribute to contain the filler.

In the case of soft holding elements the slender metallic structures may be embedded therein, e.g. by sewing starting from a continuous metallic wire, i.e. a metallic filiform slender structure, the sewing operation resulting in metallic slender structures satisfying the geometrical constrains and conditions of the present invention. A non-limiting example of an application for this type of shock-absorbing device is for the manufacturing of reinforced car safety belts.

As discussed above, all the shock-absorbing devices according to the present invention are characterized in that the mutual distance between at least two slender metallic structures is equal to or lower than 0,75*L, wherein L is the length of the slender metallic structure. Such a distance is preferably lower than 0.25*L.

Another alternative definition for a preferred subclass of shock-absorbing devices according to the present invention is by means of the density of the slender metallic structures per unit of area, defined as the ratio between the area occupied by the slender metallic structures and the overall surface area of the holding element of the shock-absorbing device on which the slender metallic structures are fixed. This ratio that shall be equal to or higher than $10^{-4}$, preferably equal to or higher than $10^{-3}$.

Suitable materials for the manufacturing of the holding element or elements may be metallic, plastic, fabric or polymeric materials. The thickness of the holding element or elements is preferably equal to or higher than the diameter of the slender metallic structures when filiform structures are employed or their thickness when laminar or sheet structures are used, and more preferably equal to or higher than five times the diameter or thickness. As a general rule, the harder is the material of which the holding element or elements are made, the lower is their thickness. It will be understood that fabrics incorporating the slender metallic structures are not subject to these criteria.

The holding elements of the shock-absorbing device according to the invention may be made of the same or different materials and may have the same or different geometries.

Metallic materials particularly suitable to be used for the slender metallic structures are steels, harmonic steel as preferred, aluminum and its alloys, copper and its alloys, titanium and its alloys, magnesium and its alloys, nickel and its alloys.

Particularly useful for the manufacturing of the straight and/or flat slender metallic structures of the shock-absorbing devices of the invention is the use of smart metals. Smart metals comprise superelastic alloys and shape memory metals, the latter being also known in the field with the acronym "SMA". These materials are widely known in the field and e.g. described in the European patent EP0226826, which concerns superelastic and shape memory Ni—Ti alloys.

Although various composition of smart metals (SMA and superelastic) are known, the smart metals most used in the field are those based on Ni—Ti alloys, wherein nickel and titanium form at least 70 wt % of the alloy. The most common alloy comprises from 54 to 55.5% by weight of nickel, balance titanium (traces of other components are possible, typically their overall content being less than 1 wt %).

These alloys are usually fully characterized not only by their composition, but also by their behavior when subjected to a heating process (typically by supplying them with a controlled current), that causes their transition between the two stable phases (Austenite, Martensite). In particular As and Af are the start and finish temperature at which the Austenitic phase transformation starts, and Ms and Mf are instead the ones characterizing the Martensitic phase; more details and information on the behavior of alloys that undergo reversible austenitic-martensitic transformations, such as Nitinol, can be found in various publications, such as for example the U.S. Pat. No. 4,067,752.

Also other useful alloys envision the addition of amounts of one or more other elements. In this regards other alloys appreciated in the field are Ni—Ti—Cu alloys, such as the alloys described in the U.S. Pat. No. 4,144,057, or other Nitinol ternary alloys containing up to 10% of an additional element as described in the international patent application WO 2011/053737, in this regards particular preferred are Ni—Ti—Co and Ni—Ti—Cr alloys. The useful property of the SMA materials is that they revert to their original shape when subjected to a heating treatment, so in the shock-absorbing device according to the present invention they find two main ways of employment; they may restore the properties of the shock-absorbing device after it has been subjected to too many hits or to an excessive load, or they may be used as witness when used jointly with other materials, exhibiting higher elasticity, such as the superelastic ones.

In view of the above, there are some preferred configurations for the shock-absorbing devices according to the present invention.

A first preferred configuration envisions the use of at least 30% and more preferably of at least 90% of the metallic slender metallic structures made of a superelastic metal material. These shock-absorbing devices are the one exhibiting the highest resistance.

Another preferred configuration of the shock-absorbing devices according to the present invention envisions the presence of at least one shape memory slender metallic structure. This is particularly advantageous in the case of shock-absorbing devices comprising a high number of superelastic slender structure, since the shape memory element may be the sole witness that the system has undergone an impact. Heating of the shock-absorbing device can restore the shape of the shape memory filament, thus re-setting its functionality as impact sensor within the system.

Also advantageous are shock-absorbing devices using a mix of straight and/or flat slender structures made of different smart materials, in particular shock-absorbing devices comprising at least 30% of superelastic slender structures and 30% of shape memory slender structures or shock-absorbing devices wherein the majority of the slender metallic structures are made of shape memory materials.

The shape re-setting property of slender metallic structure made of shape memory metals may be used in two different ways. On the one hand the functionality of a shock-absorbing device may be restored by way of a controlled heating (for example by providing an electric current to the metallic slender elements) thus causing a deformed shape memory element to return to its original shape. On the other hand it is possible to tune the properties of the shock-absorbing device by controlling its temperature, e.g. by choosing slender metallic structure exhibiting a shape memory behavior rather than a superelastic behavior according to specific situations, uses, or applications.

As already outlined the preferred way to control the properties of the shape memory slender structures is by heating by supplying an electrical current. The current supply of the shock-absorbing device may advantageously be provided with a feedback control, typically on the SMA wire resistance.

The shock-absorbing device according to the preset invention may also be used not only to protect the devices where they are installed, but also elements interacting with them. More specifically, they may be part of urban elements such as traffic lights, motorway guard rails, race track safety systems, in order to provide enhanced safety conditions in case of incidents.

An example of this structure and concept, using shock-absorbing device comprising controlled shape memory slender structures is schematically shown in the top view of FIG. 11. In this case a system 110 includes a shock-absorbing device 111, which contains a holding element 1111 acting as base over which a plurality of metallic slender structures are fixed. In the particular example shown in FIG. 11, the shock-absorbing device comprises two different types of slender metallic structures respectively indicated by reference numerals 1112, 1112', . . . 1112" and 1113, 1113', 1113". Slender metallic structures 1113, 1113', 1113" are made of a shape memory metal. It is remarked that FIG. 11 is a simplified scheme, and that element 111 may be more complex, or be the most relevant part (for the purpose of the present invention) of a bigger device. The shock-absorbing device 111 is connected to a controller 112 (not shown) capable of supplying a current I. The current intensity may be regulated as a function of one or more external inputs that may be of different type and nature. In the particular example shown in FIG. 11, there are three different types of sensors, a reconstructing scenario (i.e. a webcam) 113, a pressure/impact sensor 114, and a manually operated input 115. More or less elements may be present, and also the nature may be different, as already underlined the scheme of FIG. 11 is just an exemplary one.

Among other useful applications there are stretchers for injured persons, safety garments, safety belts, shock absorbers for home and industrial appliances, accessories for bikers, bumpers, stop buffers for closure systems, part of packages for fragile items or equipment.

Safety belts are not the sole possible placement/use within vehicles and transport systems where the shock-absorbing devices according to the present invention provides further advantages, for example they may be incorporated into elements, such as side doors, seats, and the like in order to increase safety in case of incidents.

Also, the shock-absorbing device according to the present invention may be installed into supporting systems or device, such as bearings.

The shock-absorbing devices according to the present invention may be part of other system and therefore may have additional elements or layers in contact with their holding element or elements. Moreover, in the final systems there may be more than one shock-absorbing devices according to the present invention, for example as sequence of superimposed systems where the first holding structure of one system is the second holding structure of the following one. In this case it may be particularly advantageous to couple systems to different impact resistance providing a kind of composite shock-absorbing device with layered/increasing protection.

The invention will be further described by means of the following non limiting examples.

EXAMPLE 1

A series of shock-absorbing devices according to the present invention is prepared. All these systems have common geometric features as shown in FIG. 8. They are made up of two parallel metallic holding elements in the form of 70×18 mm plates made of aluminum with a thickness of 10 mm, these plates are spaced by means of 39 slender metallic structures disposed in three parallel rows. These elements are essentially parallel to each other and the minimal distance is 5 mm.

The slender metallic structures are in form of circular wires, with a diameter of 0.5 mm and a length of 30 mm, 5 mm is the length of the slender elements that enters into upper and lower holding elements, that therefore are spaced by 20 mm. The holding elements have 0.6 mm diameter holes to lodge the slender metallic structures; a cyanoacrylate glue has been used to fix and retain the slender metallic wires into the holding structure holed.

Four different samples of shock-absorbing devices are made, using a different metal for the slender structure, in particular:

Sample 1 (S1): Galvanized steel wires
Sample 2 (S2): Harmonic steel wires
Sample 3 (S3): Shape memory Nitinol wires (As: 90° C.)
Sample 4 (S4): Superelastic Nitinol wires (As: −25° C.)

The shock-absorbing devices have been tested in impact tests with Amsler pendulum, that allows to verify the energy absorbed in the impact as well as the resistance of the shock-absorbing devices. Samples 1, 2, 4 are subjected to multiple hits at the same energy (5 strokes) and then the energy is increased, starting from 0.325 J up to 2.925 J in steps of 0.325 J. Only sample 4, has been also tested at 11.7 Joule.

Sample 3, comprising shape memory wires, has undergone to a sort of accelerated test and subjected to 2 hits per energy level, since after each hit on the Amsler machine it was subjected to a heating treatment to restore the wire/slender structures original shape.

The tests for the various samples have been stopped when the shock-absorbing device lost their structural integrity, i.e. there was a significant variation in the holding element distance and/or the majority of the metallic wires lost their straight configuration; in case of sample 3, this correspond to the fact that the wires did not recover their shape, i.e. the shock-absorbing device was irreversibly damaged.

The results obtained are summarized in the table 1 reported below.

TABLE 1

| Sample ID | Number of Hits | Overall Energy (J) | Max hit Energy (J) | Total Absorbed Energy (J) | Absorbed Energy(%) |
|---|---|---|---|---|---|
| S1 | 2 | 0.3 | 0.3 | 0.58 | 90 |
| S2 | 20 | 1.3 | 1.3 | 7.96 | 50-60 |
| S3 | 8 | 3.9 | 3.9 | 7.15 | 85-95 |
| S4 | 43 | 54.66 | 11.7 | 54.66 | 80-90 |

So each of the samples made according to the present invention present advantageous features with respect standard shock-absorbing devices, in particular sample 1, although not capable to withstand higher or prolonged hits, have a very good energy absorbing feature, situation quite opposite with respect to sample 2.

Sample 3 (shape memory) and sample 4 (superelastic) have excellent features both in durability and energy absorption, therefore provide a further advantage as shock-absorbing devices. As already described, sample 3 require a heat restore treatment after each stroke.

EXAMPLE 2

In this case sample 4 is compared in a different experiment to a shock-absorbing device made according to the prior art.

In particular the comparative structure C1 is made with the same type of elements of sample 4 (superelastic Nitinol), but the wires are connecting the holding elements are not straight but curved as shown in FIG. 9, therefore violating the condition on the parallelism of the planes normal to the metallic slender structure. Comparative example C1 is representative of the behavior of a shock-absorbing device as described in the above referenced U.S. Pat. No. 6,530,564.

Sample S4 and C1 are subjected to a compressive test in a Chatillon TCD110 digital force tester, that allows to draw the Force-Stroke curve for the entire loading phase.

The results of the tests are shown in FIG. 10, where on the x-axis there is the distance reduction between the two holding elements, expressed in mm, on the y-axis the force expressed in Newton.

The area of the hysteresis cycle represent the energy absorbed by the system, and it is immediately evident that sample S4 (thicker curve 1001) possesses by far superior characteristics with respect to comparative example C1 (curve 1002).

Moreover, sample S4 possesses another interesting feature, in particular it features a kind of threshold effect, the shock-absorbing device is very rigid and resistant during the initial compression, and then deforms and therefore absorbs the energy. This behavior is different and opposite to usual shock-absorbing device that increase their rigidity/resistance for increasing loads and is particularly appreciated in some applications, for example for injured person transportation systems such as stretcher or handbarrows.

The invention claimed is:

1. A shock-absorbing device comprising:
a first holding element and a plurality of slender metallic structures having a first end and a second end, wherein the slender metallic structures are respectively fixed at their first ends to said first holding element, wherein the slender metallic structures are fixed at different points of said holding element, wherein:
a second holding element and wherein second ends of said slender metallic structures opposite to their first ends are fixed to said second holding element, said slender metallic structures being respectively fixed at different points of said second holding element,
said slender metallic structures respectively having a slenderness ratio equal to or higher than 10, wherein:
the mutual distance between the slender metallic structures of at least one pair of slender metallic structures is equal to or lower than 0.75 times their length L, said distance being measured with respect to their first ends,
at least 90% of the planes perpendicular to adjacent slender structures are parallel to each other or form an angle equal to or lower than 20°,
the slender metallic structures are flat laminar or sheet elements or straight filiform or wire elements,
at least 90% of the slender metallic structures are made of shape memory metal,
said length L is between 3 mm and 30 cm,
the ratio between the area occupied by the slender metallic structures and the overall surface area of the holding element to which the slender metallic structures are fixed is equal to or higher than $10^{-4}$, and
the slender metallic structures are arranged so as to absorb energy of impacts acting in a direction perpendicular to planes that are in turn perpendicular to the slender structures.

2. A system comprising the shock-absorbing device according to claim 1.

3. The system according to claim 2, wherein the system is a vehicle.

4. The system according to claim 3, wherein the shock-absorbing device is incorporated into a bumper of said vehicle.

5. The system according to claim 3, wherein the shock-absorbing device is incorporated into a safety belt of said vehicle.

6. The system according to claim 3, wherein the shock-absorbing device is incorporated into a seat of said vehicle.

7. The system according to claim 2, wherein the system is a closure system.

8. The system according to claim 2, wherein the system is a part or a component of a supporting element.

9. The system according to claim 2, wherein the system is a transport system for injured person.

10. The system according to claim 2, wherein the shock absorbing device is incorporated into cloth.

11. The system according to claim 2, wherein the system is home or industrial appliance.

12. The system according to claim 2, wherein the system is a package.

13. The shock-absorbing device according to claim 1, further comprising one or more elements external to the holding element.

14. The shock-absorbing device according to claim 13, further comprising a plurality of first holding elements layered onto each other, each of said first holding elements being fixed to a plurality of respective slender metallic structures.

15. The shock-absorbing device according to claim 1, wherein the overall configuration of the device is such that the slender structures are subjected, in use, to compressive loads directed along their axes in the case of filiform or wire elements or parallel to their planes in the case of laminar or sheet elements.

16. The shock-absorbing device according to claim 1, wherein said holding element is a planar-shaped element.

17. The shock-absorbing device according to claim 1, wherein said shock-absorbing device has a spherical shape and said first holding element is a central member thereof.

18. The shock-absorbing device according to claim 1, wherein second ends of said slender metallic structures opposite to their first ends are free ends.

19. The shock-absorbing device according to claim 1, wherein at least one of the slender metallic structures is made of a shape memory metal.

20. The shock-absorbing device according to claim 1, wherein the first ends of the slender metallic structures extend into the holding element and are blocked therein.

* * * * *